US008581926B2

(12) United States Patent
Peebler

(10) Patent No.: US 8,581,926 B2
(45) Date of Patent: Nov. 12, 2013

(54) SYSTEMS FOR ADVANCED EDITING AND RENDERING OF IMAGES

(75) Inventor: Bradley W Peebler, San Mateo, CA (US)

(73) Assignee: Luxology, LLC, Mountain View, CA (US)

( * ) Notice: Subject to any disclaimer, the term of this patent is extended or adjusted under 35 U.S.C. 154(b) by 956 days.

(21) Appl. No.: 11/999,148

(22) Filed: Dec. 3, 2007

(65) Prior Publication Data

US 2008/0129729 A1 Jun. 5, 2008

Related U.S. Application Data

(60) Provisional application No. 60/873,225, filed on Dec. 5, 2006.

(51) Int. Cl.
*G09G 5/00* (2006.01)
(52) U.S. Cl.
USPC .............................. 345/619; 345/581; 345/672
(58) Field of Classification Search
USPC .......................................... 345/423, 629, 419
See application file for complete search history.

(56) References Cited

U.S. PATENT DOCUMENTS

| 6,037,949 | A | 3/2000 | DeRose et al. |
|---|---|---|---|
| 6,195,098 | B1 * | 2/2001 | Brittain et al. ................. 345/422 |
| 6,204,851 | B1 * | 3/2001 | Netschke et al. ............. 345/419 |
| 6,222,553 | B1 | 4/2001 | DeRose et al. |
| 6,300,960 | B1 | 10/2001 | DeRose et al. |
| 6,489,960 | B2 | 12/2002 | DeRose et al. |
| 6,532,021 | B1 * | 3/2003 | Tognazzini et al. ........... 345/629 |
| 6,556,195 | B1 * | 4/2003 | Totsuka et al. ................ 345/419 |
| 6,760,024 | B1 | 7/2004 | Lokovic et al. |
| 7,023,438 | B2 | 4/2006 | Lokovic et al. |
| 7,233,332 | B2 | 6/2007 | Lokovic et al. |
| 7,319,467 | B2 | 1/2008 | Weyrich et al. |
| 2004/0263511 | A1 | 12/2004 | West et al. |
| 2005/0017971 | A1 * | 1/2005 | Ard ............................... 345/423 |
| 2005/0081161 | A1 * | 4/2005 | MacInnes et al. ............. 715/765 |
| 2005/0231530 | A1 * | 10/2005 | Liang et al. ................... 345/619 |
| 2009/0296984 | A1 * | 12/2009 | Nijim et al. ................... 382/103 |

* cited by examiner

*Primary Examiner* — Phi Hoang
(74) *Attorney, Agent, or Firm* — Gordon & Rees LLP

(57) ABSTRACT

A system of editing and rendering an on-screen image, by: storing 3D data of an object; storing a 2D image of surroundings of the object; and displaying a 2D image of the object concurrently with the 2D image of the surroundings of the object; editing the 3D image of the object; and rendering the edited 3D image of the object.

Optionally, editing the image includes: editing the image in a 2D viewer; editing the image by interactive ray tracing when it is not possible to edit the edit the image in a 2D viewer; and editing the image by a hardware accelerated offline render path when it is not desirable to edit the image by interactive ray tracing.

Optionally, rendering the edited 3D data of the object includes: rendering the image by an interactive ray tracing; rendering the image by a hardware accelerated render path when it is not desirable to render the image by interactive ray tracing; and rendering the image by an offline software rendering when it is not desirable to render the image by a hardware accelerated render path.

In optional aspects, the 3D image data set can be tagged with user-defined properties that may optionally be edited in pop-up or drop-down menus.

10 Claims, 19 Drawing Sheets

SYSTEMS FOR ADVANCED EDITING AND RENDERING OF IMAGES

RELATED APPLICATION

The present application claims priority under 35 U.S.C. Section 119 to U.S. Provisional patent application 60/873,225, entitled "Systems for Advanced Editing and Rendering of Images", filed Dec. 5, 2006.

TECHNICAL FIELD

The present invention relates to systems for advanced editing and rendering of on screen computer images.

BACKGROUND OF THE INVENTION

Existing computer systems do not permit easy editing of images of objects (e.g.: photo images) within on screen documents such that the properties, characteristics or angle of view of the object can be changed easily and quickly re-displayed within an on screen document or background.

What is desired is a system that instead provides advanced editing features such that an operator can quickly and easily edit the characteristics or angle of view of a particular object displayed on a computer screen. Most preferably, such a system would allow the selected objects to be stored as 3D object data sets and to be edited as such, even when such objects are simply displayed on screen as 2D objects.

SUMMARY OF THE INVENTION

The present invention is a system that takes a standard 2D image of an on-screen object and packages it with extra data such that advanced editing can easily be accomplished. As such, the present system provides a deeper level of editing than is possible with traditional 2-D images.

In one aspect, the present invention stores a 3D image of an object, but displays the image as an on screen 2D image (For example, in a TIFF file). Preferably, any standard image viewer such as Photoshop can be used to open and view the 3D image as a 2D bitmap. As such, the operator can preferably easily edit the image with standard tools, including, but not limited to, adjustments to brightness, contrast, and gamma correction. The operator is, however, able to easily access and edit the 2D properties of the object, which can then be re-displayed as an updated 2D object. Optionally, the 3D image can also be edited and viewed in a 3D enabled viewer.

In preferred aspects, the 3D image can be "tagged" with various user-defined properties, and the operator can then select between various options for these properties when editing the image. In optional aspects, the various "tagged" properties can be edited through drop-down or pop-up menus.

The present invention includes a variety of rendering systems. In various aspects, rendering can be done by: (1) interactive ray tracing, (2) real time hardware rendering, or by (3) an offline render path. Interactive ray tracing rendering has the advantage of achieving a variable resolution with naturally degrading image quality to maintain interactivity, whereas an offline render path has the advantage of achieving a fixed resolution and quality but can not be used for interactive edits. In cases where the user wishes to edit in 3D some dataset that is of significant complexity, the second (i.e.: "real time hardware") render path can be used. This real-time hardware accelerated rendering path can optionally use industry standard realtime libraries such as OpenGL or DirectX. In the case of these realtime renderers, the quality and scope of features is more limited in exchange for significantly better user interaction speeds. This approach provides a visual proxy of the dataset rather than an interactive look at the actual rendered final pixels.

An advantage of the present invention is that the rendering of an object within a document can be progressive, with an operator optionally selecting both the degree to which such rendering is carried out, and optionally, the method of rendering itself. As such, the operator can view (and simultaneously work with) the object during the progressive rendering.

In accordance with one exemplary embodiment of the invention, the following steps are carried out.

Step 1—A 3D image of an object is stored in the computer system. This 3D image is preferably displayed as a simple 2D image of the object (on a 2D background image or document).

Step 2—The operator begins to edit the image of the object. Simple edits can be carried out by editing the 2D image of the object. (Such simple edits may include, but are not limited to, adjustments to brightness, contrast, and gamma correction.) However, should the operator attempt to make an edit that would be impossible with a 2D data set representation, then the system reverts to the 3D dataset, using one of two approaches, as follows:

First—an interactive ray tracing approach can be used. This has the advantage of being fast, permitting easy real-time edits. However, the number and quality of pixels will be reduced, degrading the image.

Second—if the content is instead too complicated for the interactive ray tracing mode, the system instead uses the 3D data set in a real-time, hardware accelerated offline drawing engine such as OpenGL. This path is preferably taken when the computer system is incapable of providing frames at a desired rate.

Step 3—The user stops editing the image, and the system begins to render the image, as follows:

First, a 3D interactive ray tracing rendering engine is used. This provides a high quality representation of the 3D data in 2D space possibly including effects such as shadows, camera distortion, reflection, refraction, and other naturally occurring light effects. When using the ray tracing editing approach (above), the ray tracer simply continues to refine each pixel to deliver as "perfect" as possible a 2D representation of the stored updated 3D image. Such an interactive ray tracing approach has the advantage of providing a variable resolution. This provides a more interactive and responsive edit capability (at the expense of overall render times as the offline render process is able to use various pre-process and caching shortcuts that are impossible for a progressive approach). For example, the operator can pause or discontinue the rendering process at any desired time.

Second, if the content is instead too complicated for the interactive ray tracing mode, the system instead uses the 3D data set in a real-time, hardware accelerated offline drawing engine such as OpenGL. This path is preferably taken when the computer system is incapable of providing frames at a desired rate. This approach has the advantage of providing a fixed resolution of the image at a fixed quality level.

Third when the user has completed their edits and wishes to see the final result, the offline renderer can optionally be utilized. Although this third (offline) approach lacks flexibility, it has the ability to do pre-processing steps that the progressive render can not do. As such, a high quality image can be rendered without having to progressively refine beyond the setting chosen by the operator. For example, should the computer not be able to keep up in real time, an offline OpenGL system can be used in a "quick shade" mode.

In any of the above cases, the advantage of the present rendering system is that it provides an optimal trade-off between quality and performance such that the operator can continue to work with the image (or the background document) in real time while the render continuously upgrades the final pixel quality of the image.

In any of the above cases, the resulting rendered new 2D representation can simply be applied in front of the 3D representation (on the 2D background or document). This provides the user-advantage of never "leaving" the 2D canvass to perform these advanced 3D edits.

At this point, the image of the object can once again be edited in 2D space, or reverted to 3D data to repeat the process again.

DETAILED DESCRIPTION OF THE DRAWINGS

As will be described, the present invention provides a variety of novel systems for editing and rendering of images, in which:

FIGS. 1 to 5 show a first example of editing and rendering an image according to the invention in which a real time hardware accelerated render path is used.

FIGS. 6 to 10 show a second example of editing and rendering an image according to the invention in which a real time hardware accelerated render path is used.

FIGS. 11 to 19 show a third example of editing and rendering an image according to the invention in which a progressive render path is used. In this example, the editing of "tagged" attributes of the images are also displayed.

In each of these examples, a system of editing and rendering an on-screen image is provided, comprising: storing 3D data of an object; storing a 2D image of surroundings of the object; displaying a 2D image of the object concurrently with the 2D image of the surroundings of the object; editing the 3D image of the object; and rendering the edited 3D image of the object.

Editing the image comprises: editing the image in a 2D viewer; editing the image by interactive ray tracing when it is not possible to edit the edit the image in a 2D viewer; and editing the image by a hardware accelerated offline render path when it is not desirable to edit the image by interactive ray tracing.

Rendering the edited 3D data of the object comprises: rendering the image by an interactive ray tracing; rendering the image by a hardware accelerated render path when it is not desirable to render the image by interactive ray tracing; and rendering the image by an offline software rendering when it is not desirable to render the image by a hardware accelerated render path.

In various aspects, the rendered image can be displayed as a 2D image in front of a 3D representation of the image. In addition, the 3D image can be viewed in a 2D image viewer, or in a 3D enabled image viewer.

Figure 1:
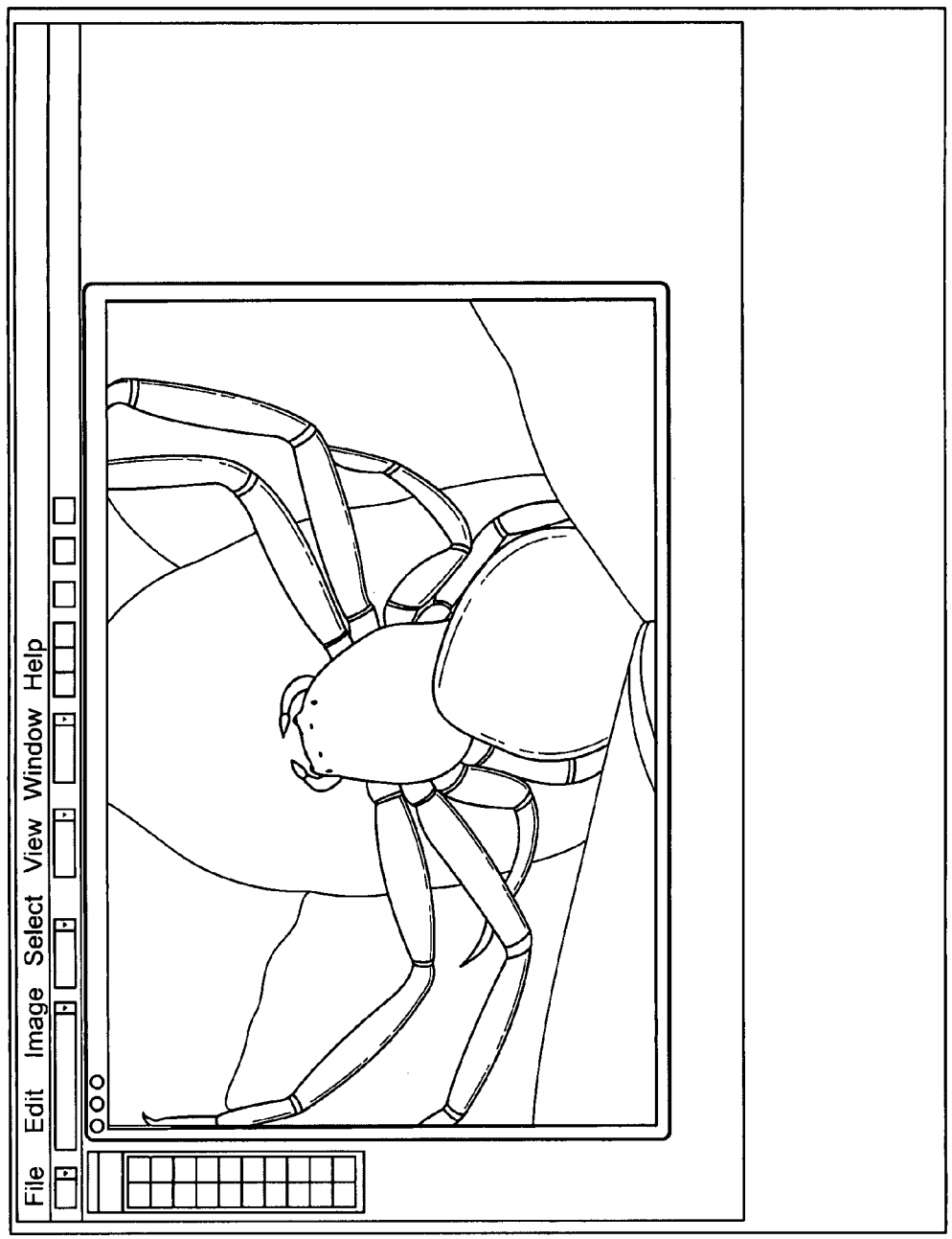
FIG. 1 is a screen shot of a 2D image of a spider.
Figure 2:
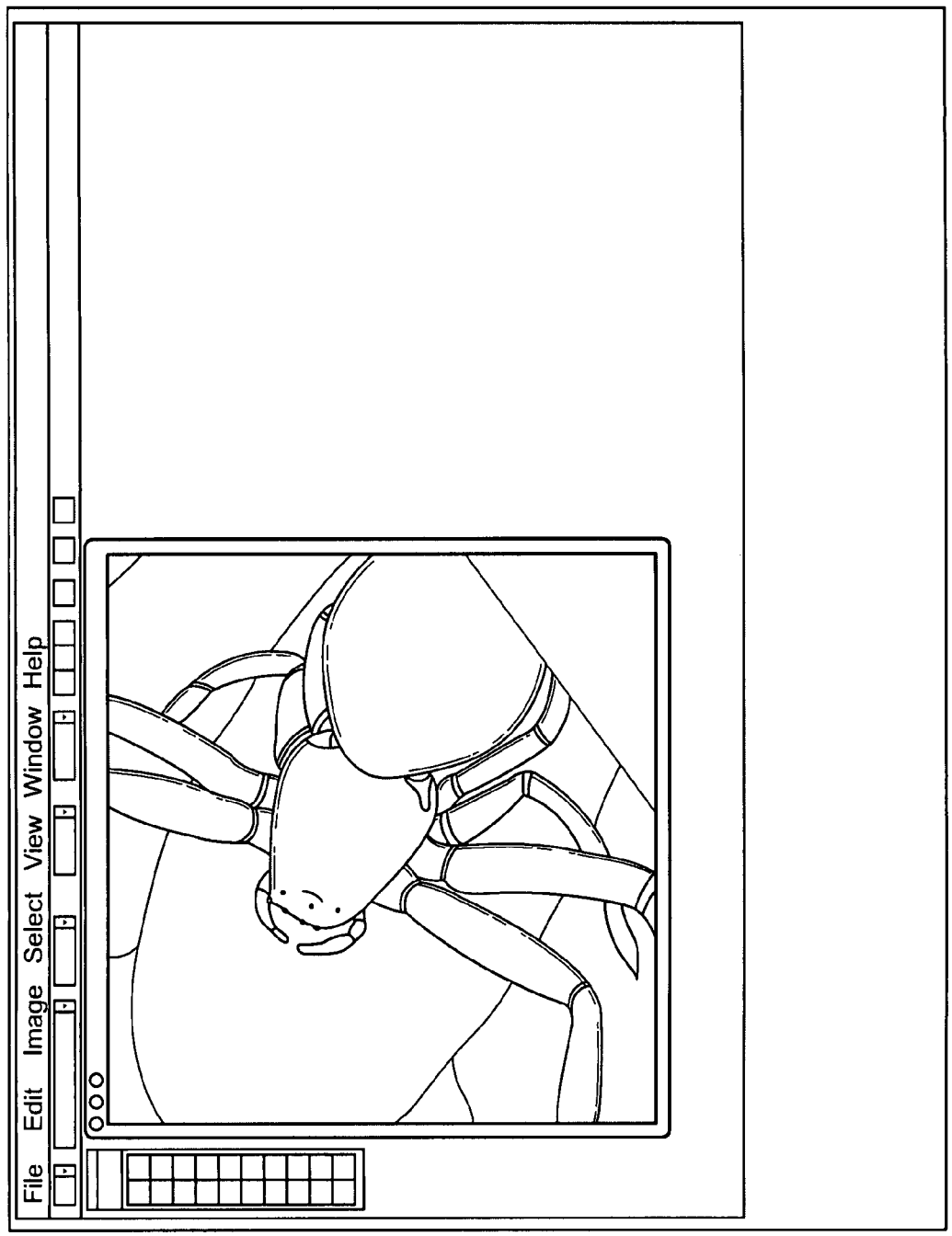
FIG. 2 is a screen shot of the image of FIG. 1 being edited by an operator to change the angle at which the image is viewed.
Figure 3:
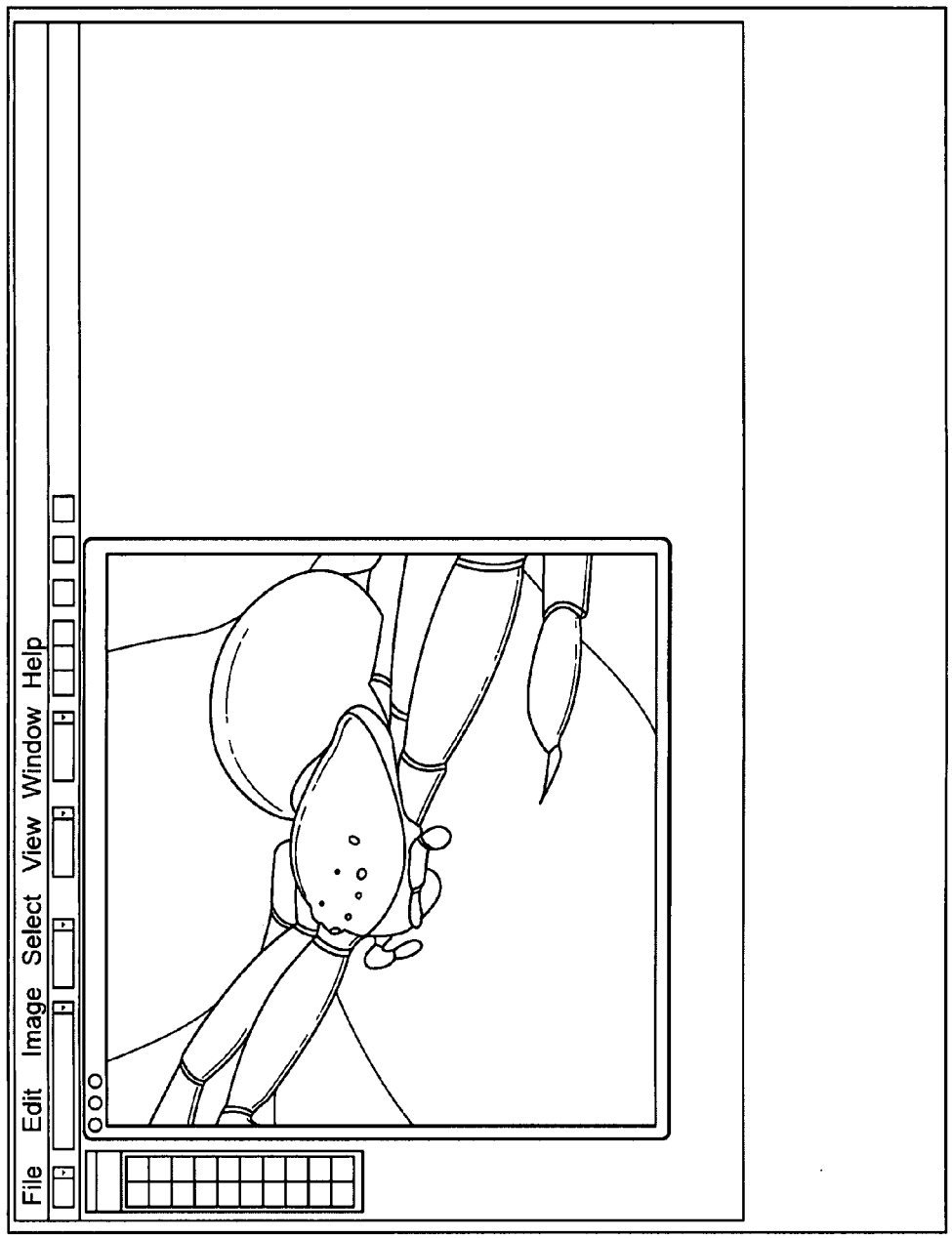
FIG. 3 is a screen shot of the image of FIGS. 1 and 2 upon completion of the editing by the operator.
Figure 4:
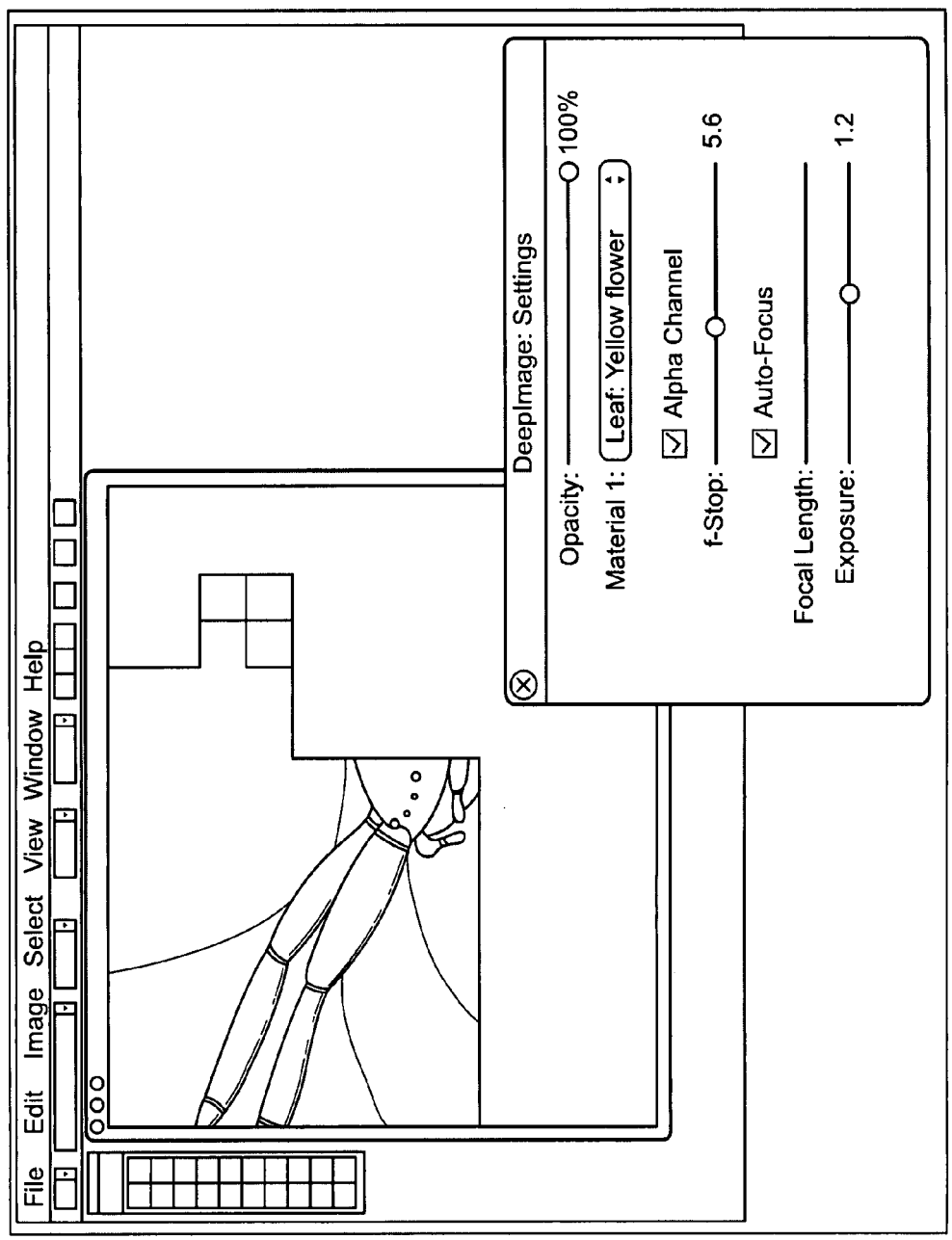
FIG. 4 is a screen shot of the rendering of the imager of FIG. 3 using a hardware accelerated render path.
Figure 5:
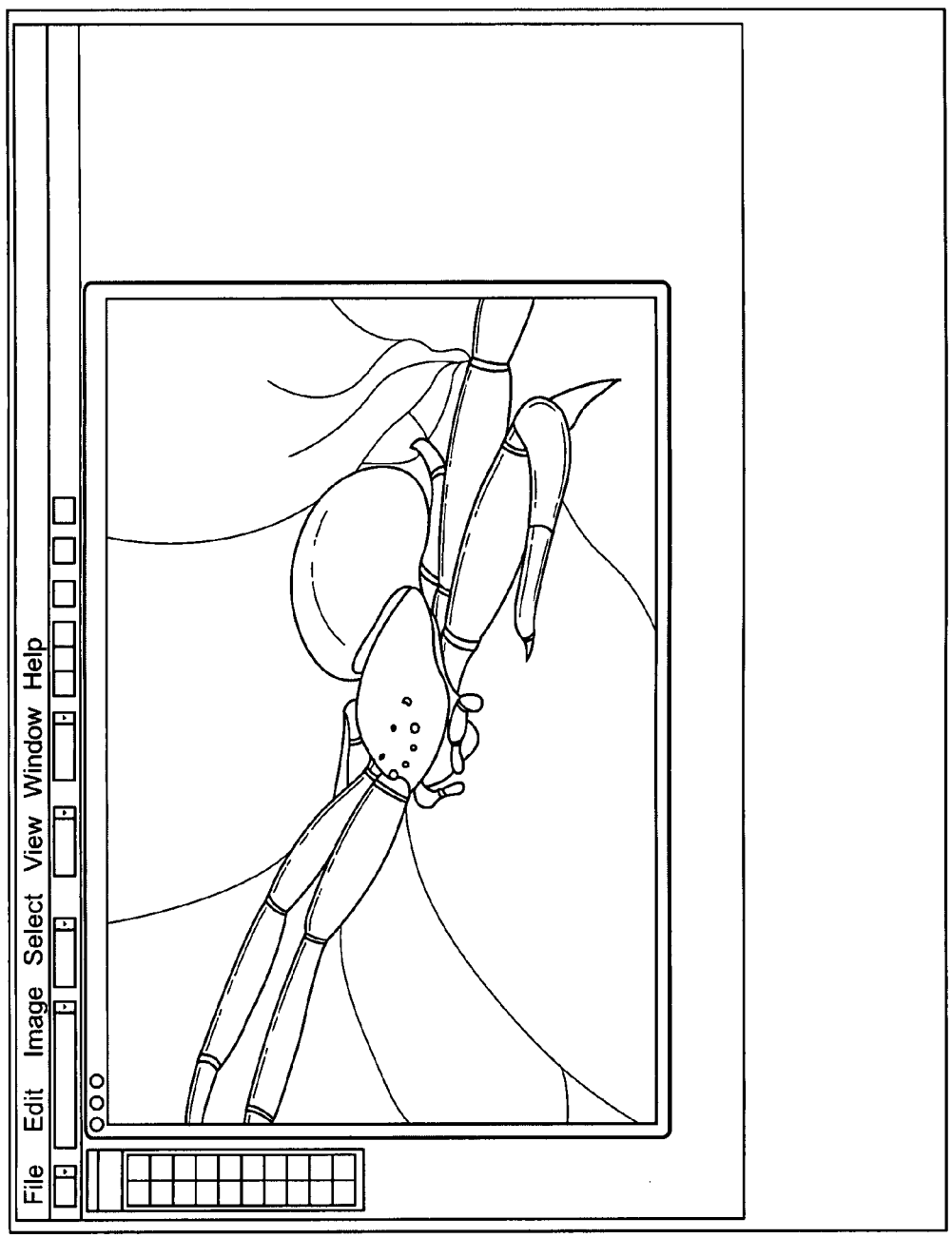
FIG. 5 is a screen shot of the final rendered image of FIG. 4.
Figure 6:
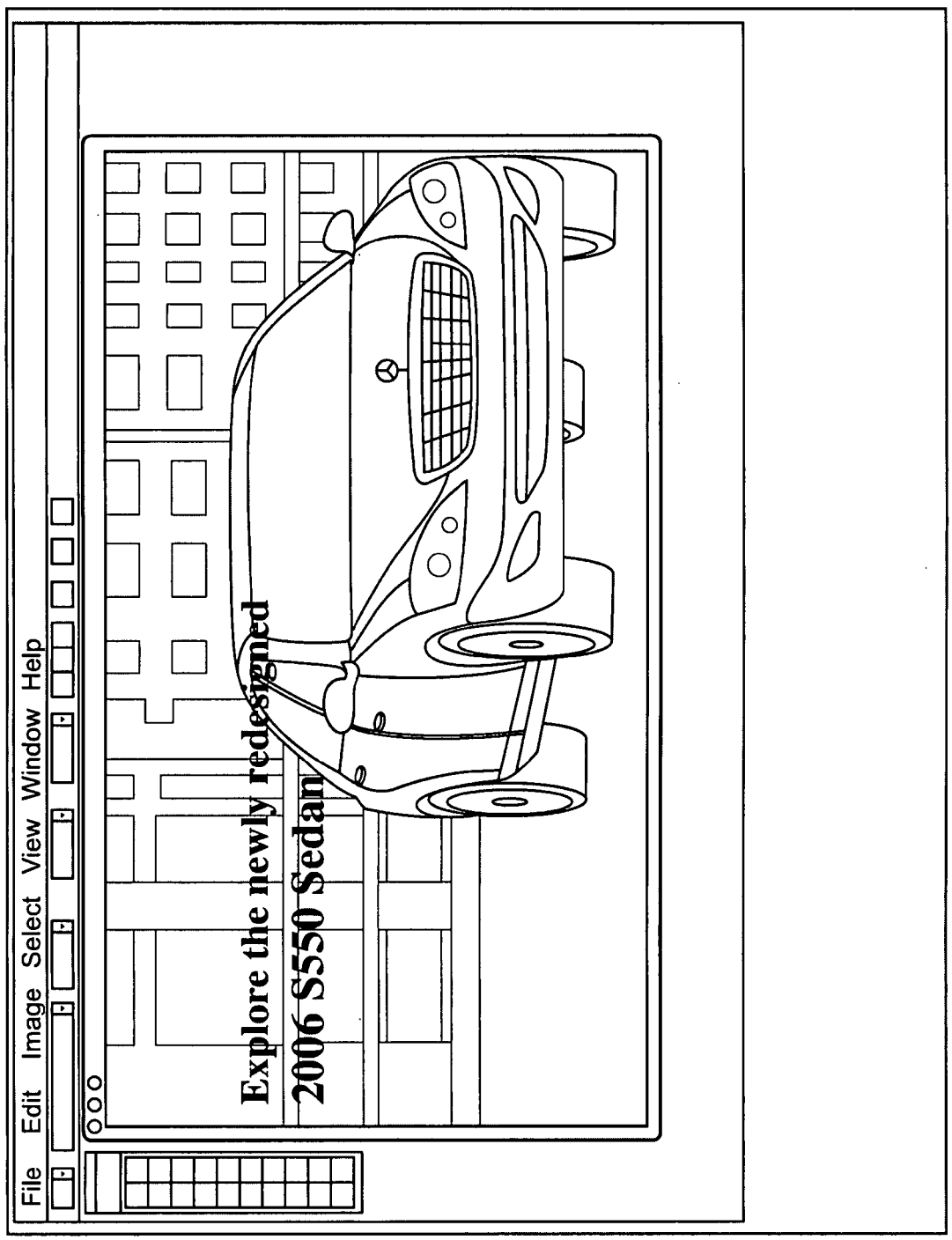
FIG. 6 is a screen shot of a 2D photo image of a car with an operator typing text over the image.

Turning first to FIGS. 1 to 5, an example of a system of editing and rendering an on-screen image is provided, as follows. First, a 3D data set of an 2D object is stored. As such, storing a 3D image of an object comprises storing extra data to a standard 2D image of the object. In this particular case, the 3D data set represents a crab spider (and the plant upon which it rests) is stored. This image is viewed in 2D in FIG. 1. Then, an operator desires to change the angle at which the image is viewed. The operator makes this edit as seen in successive FIGS. 2 and 3, at which point the editing is completed. Next, as seen in FIG. 4, an offline render path is then used to render the final image as seen in final FIG. 5.

In this example (and the following example), it is not desirable to edit the image by interactive ray tracing when it is not possible to provide frames at a desired rate. In such case, a hardware accelerated offline render path can be used. For example, the hardware accelerated offline render path can be an OpenGL, Direct X or similar realtime hardware accelerated render engine.

Figure 7:
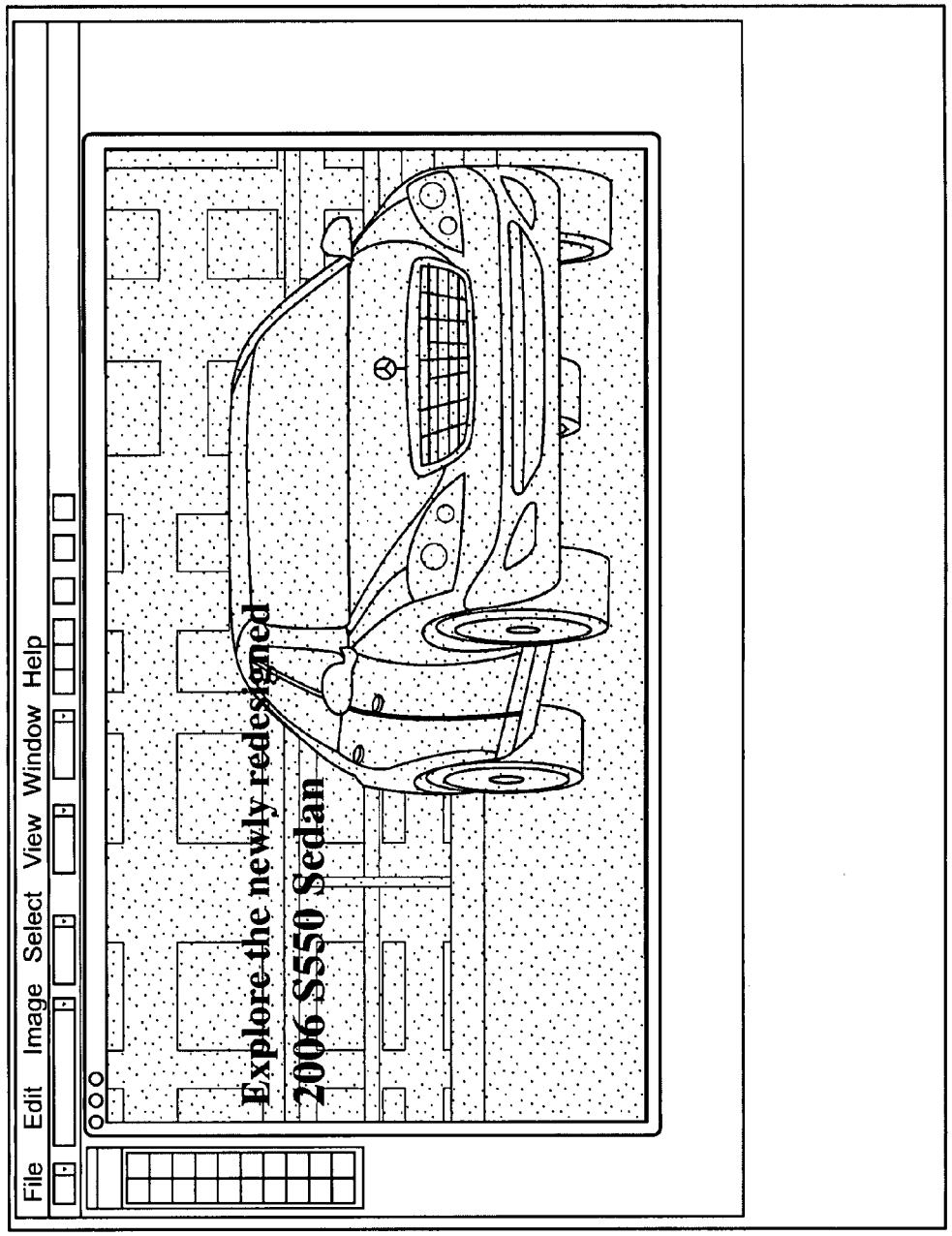
FIG. 7 is a screen shot of the image of FIG. 6 being edited by an operator to change the angle at which the image is viewed.
Figure 8:
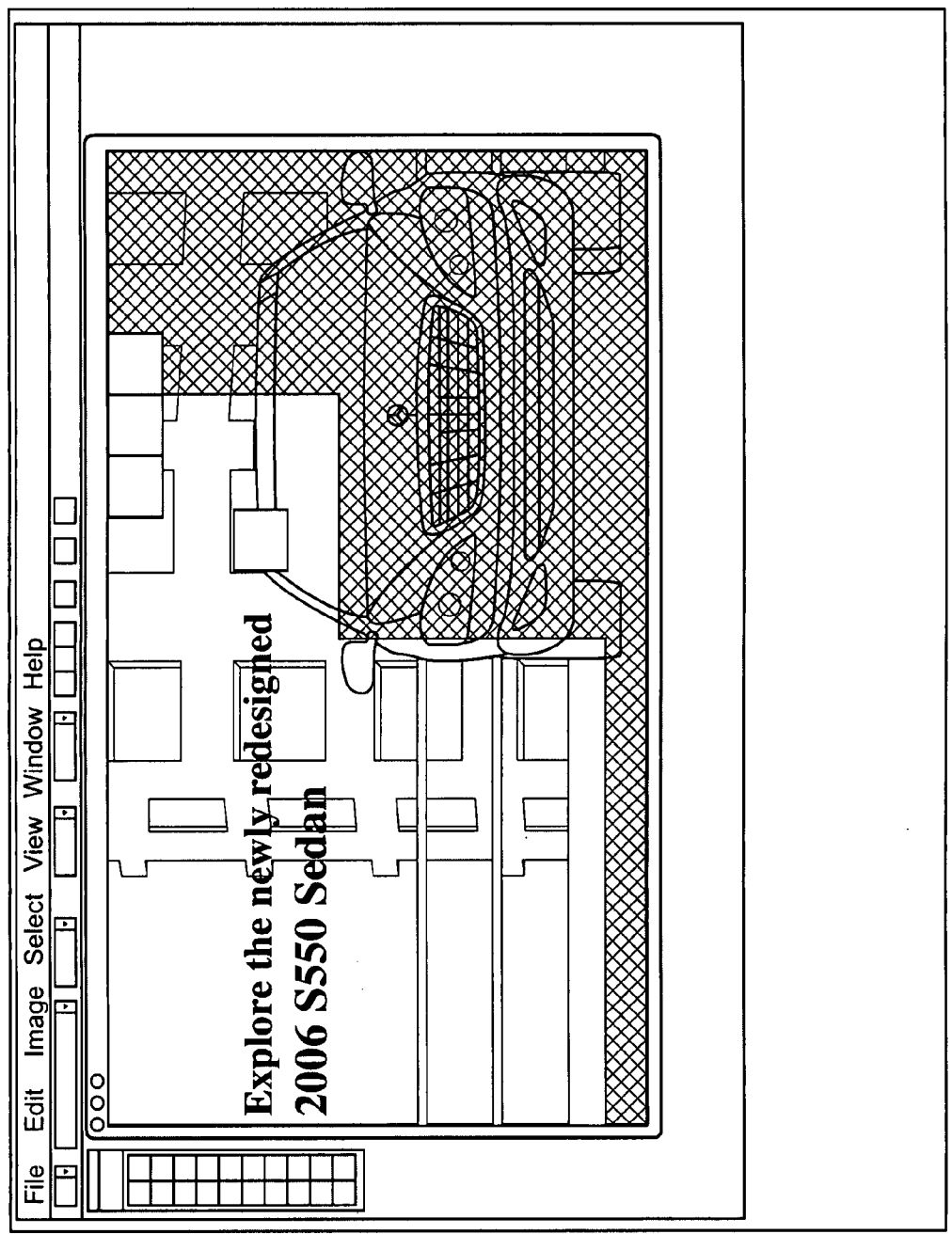
FIG. 8 is a screen shot of the image of FIGS. 6 and 7 upon completion of the editing by the operator.
Figure 9:
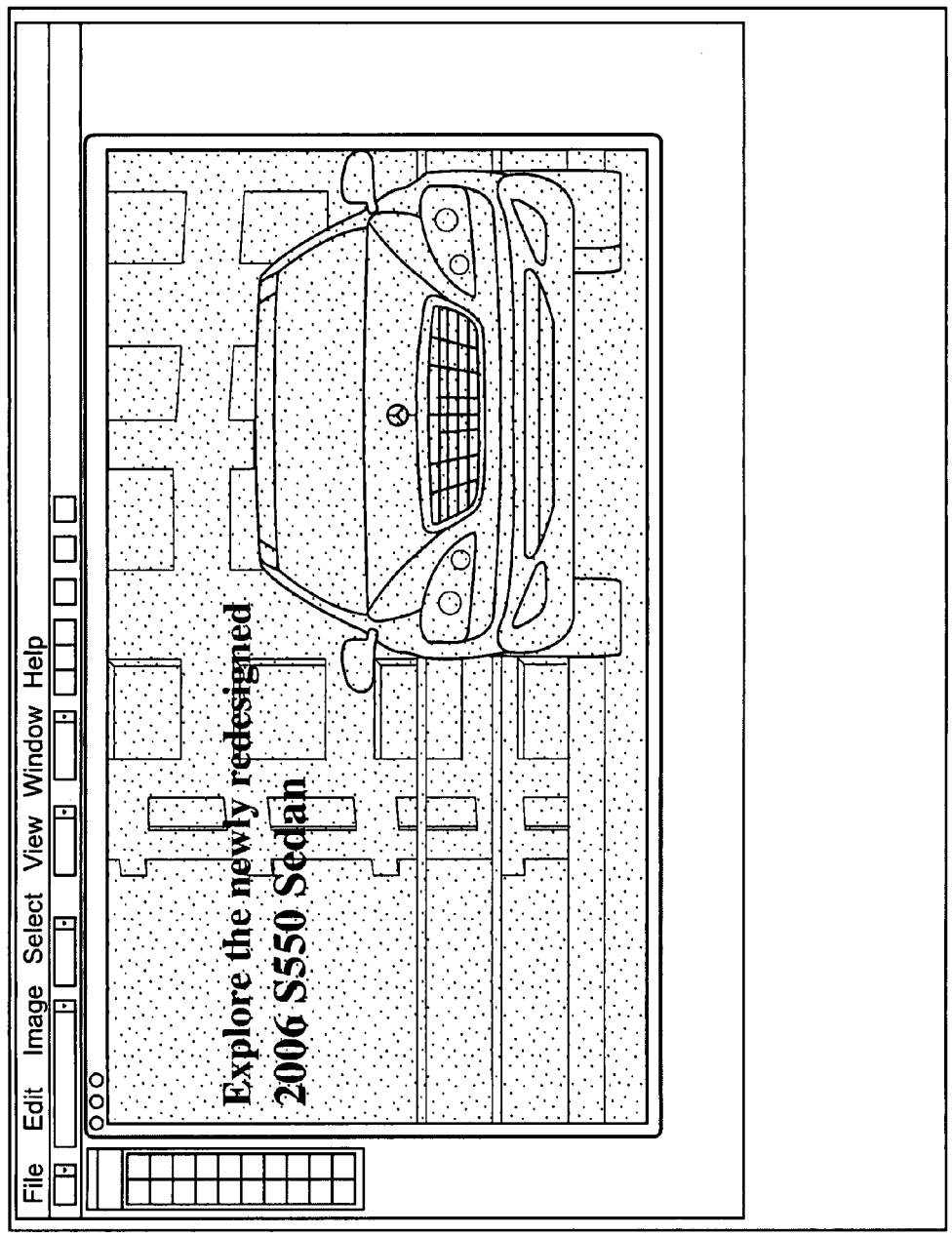
FIG. 9 is a screen shot of the rendering of the imager of FIG. 8 using a hardware accelerated render path.
Figure 10:
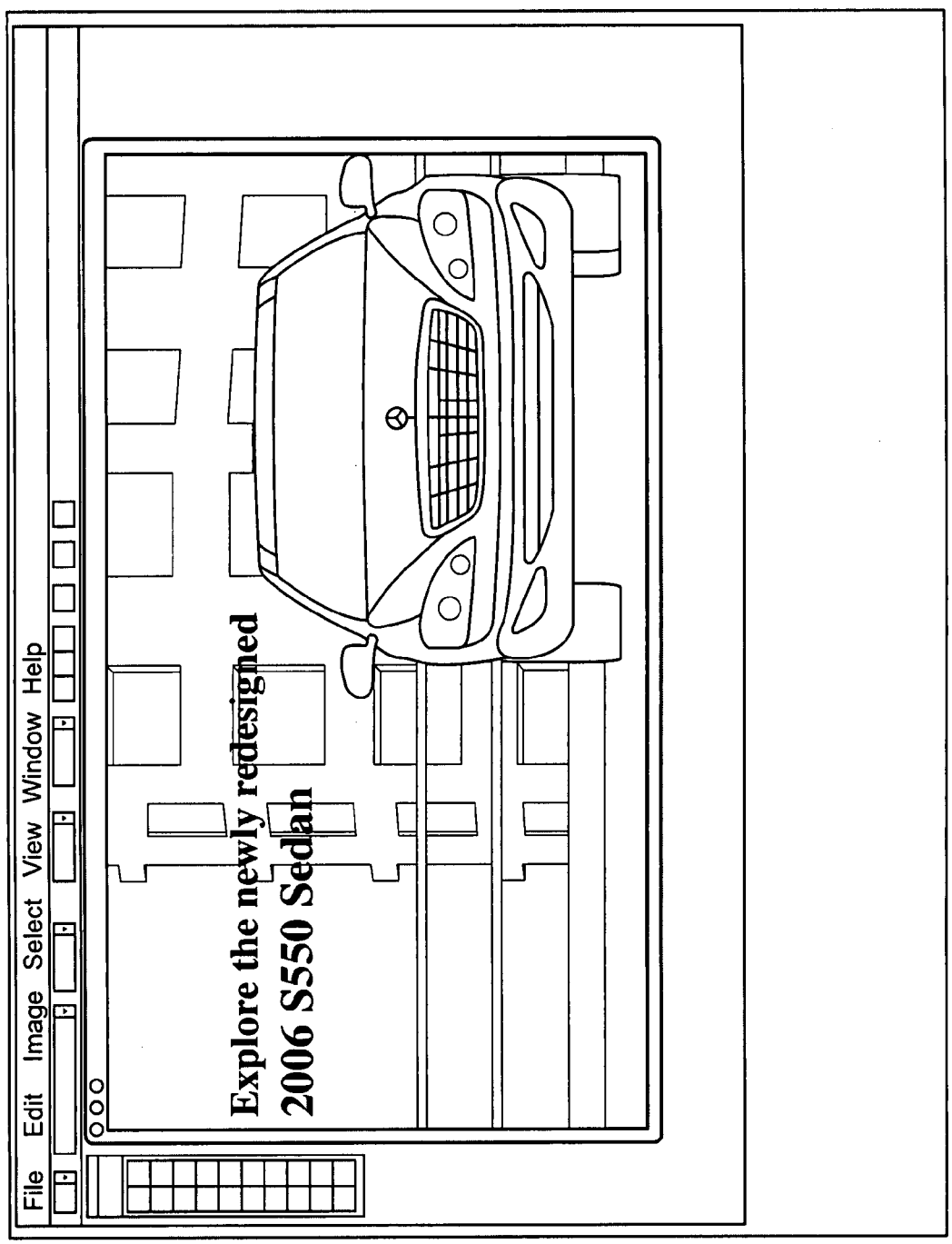
FIG. 10 is a screen shot of the final rendered image of FIG. 9.
Figure 11:
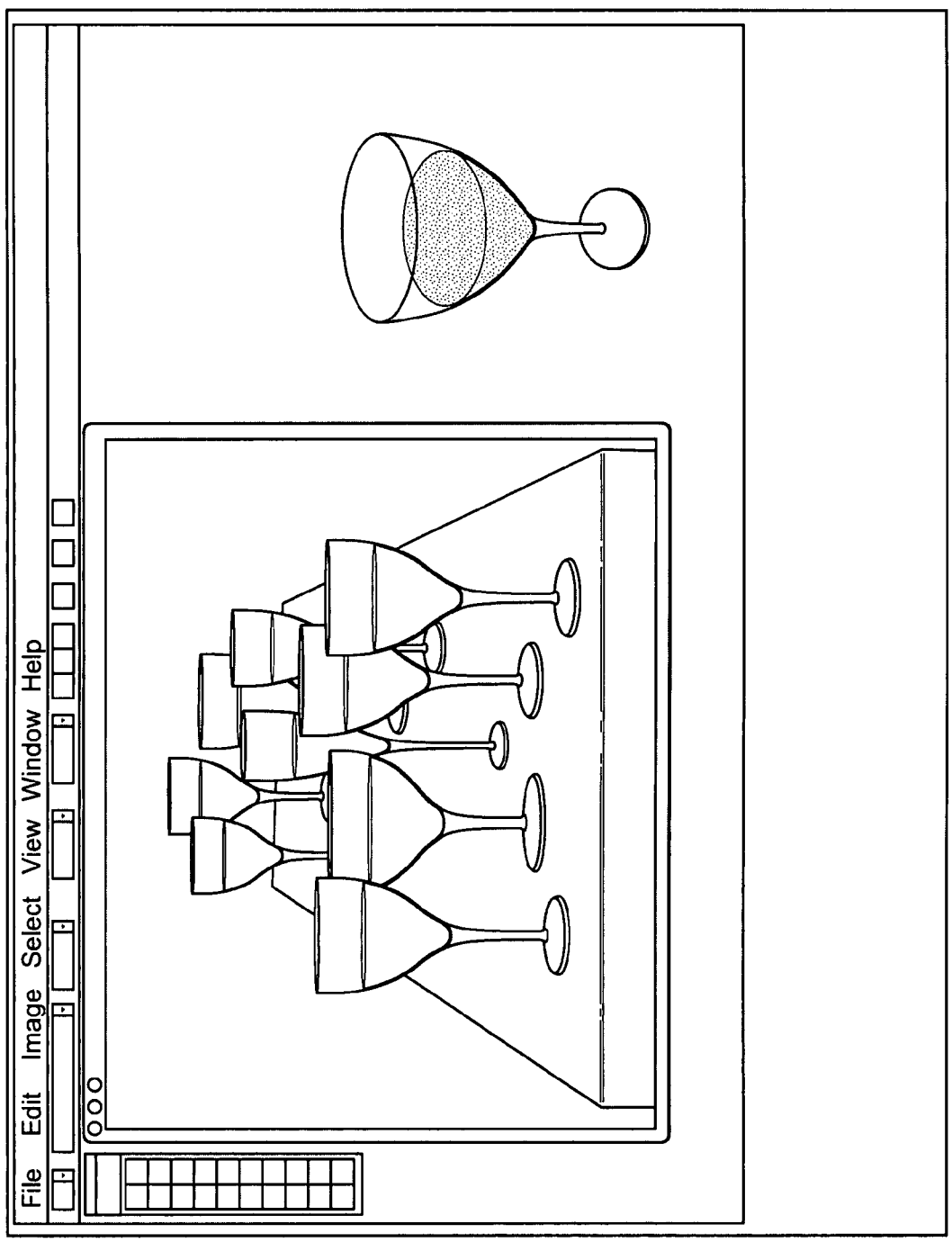
FIG. 11 is a screen shot of an image showing a 2D representation of a 3D data set of a wine glass superimposed on a 2D document.

Turning next to FIGS. 6 to 10, a second example of a system of editing and rendering an on-screen image is provided, as follows. First, a 3D data set of a 2D object is stored. In this particular case, the 3D data set represents a car. An operator has just added text to this image. Unfortunately, the added text has started to overlap on top of the car, as can be seen. Therefore, as seen in FIGS. 7 and 8, the operator begins to edit the image of the car to change the angle at which the car is viewed such that the position of the can be changed relative to the text. In this way, it is possible to move the car to avoid the operated added text, as opposed to vice versa. Next, as seen in FIG. 9, an offline render path is then used to render the final image as seen in final FIG. 10.

Figure 12:
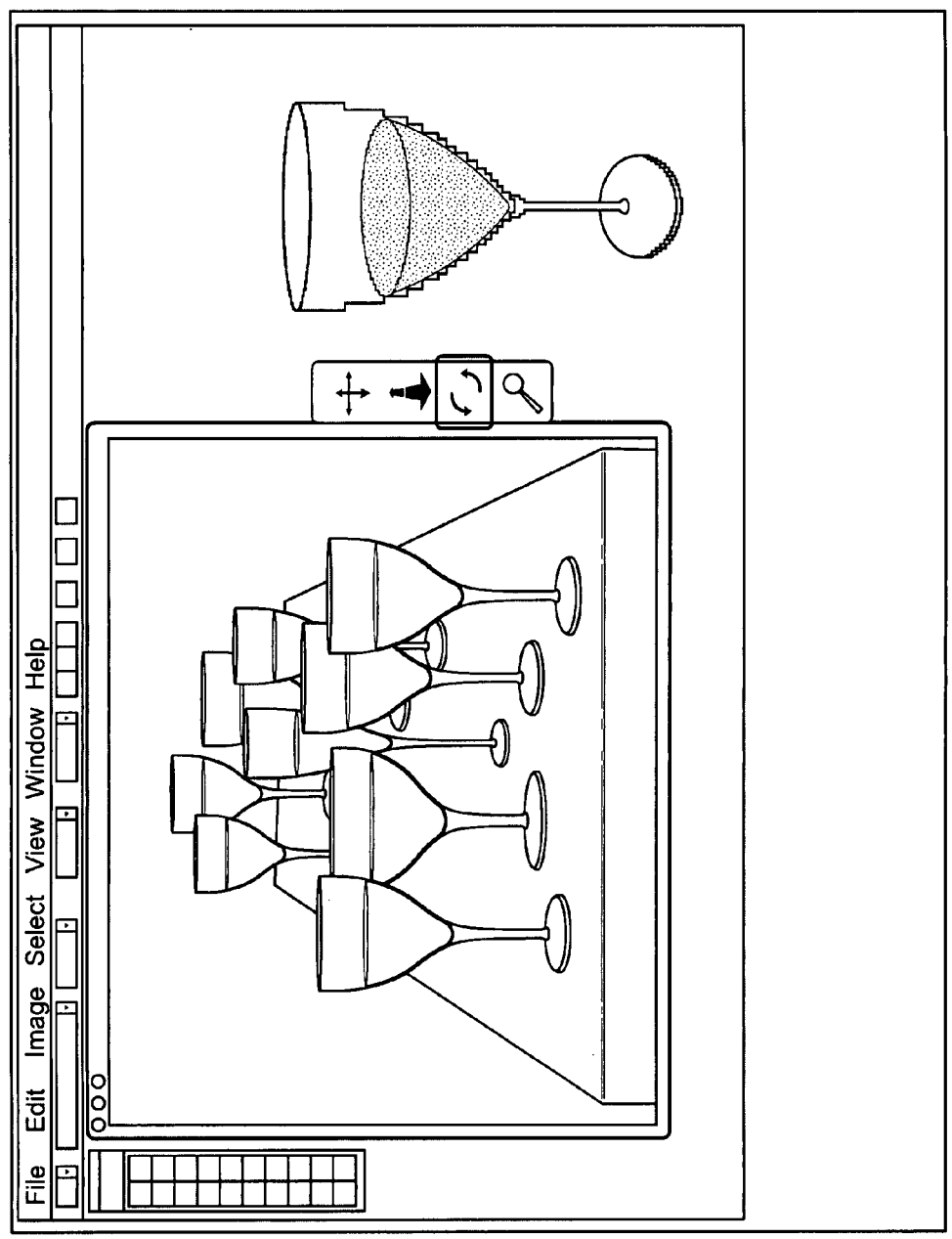
FIGS. 12 and 13 are successive screen shots of the wine glass of FIG. 11 being edited by an operator to change the angle at which the image is viewed.
Figure 13:
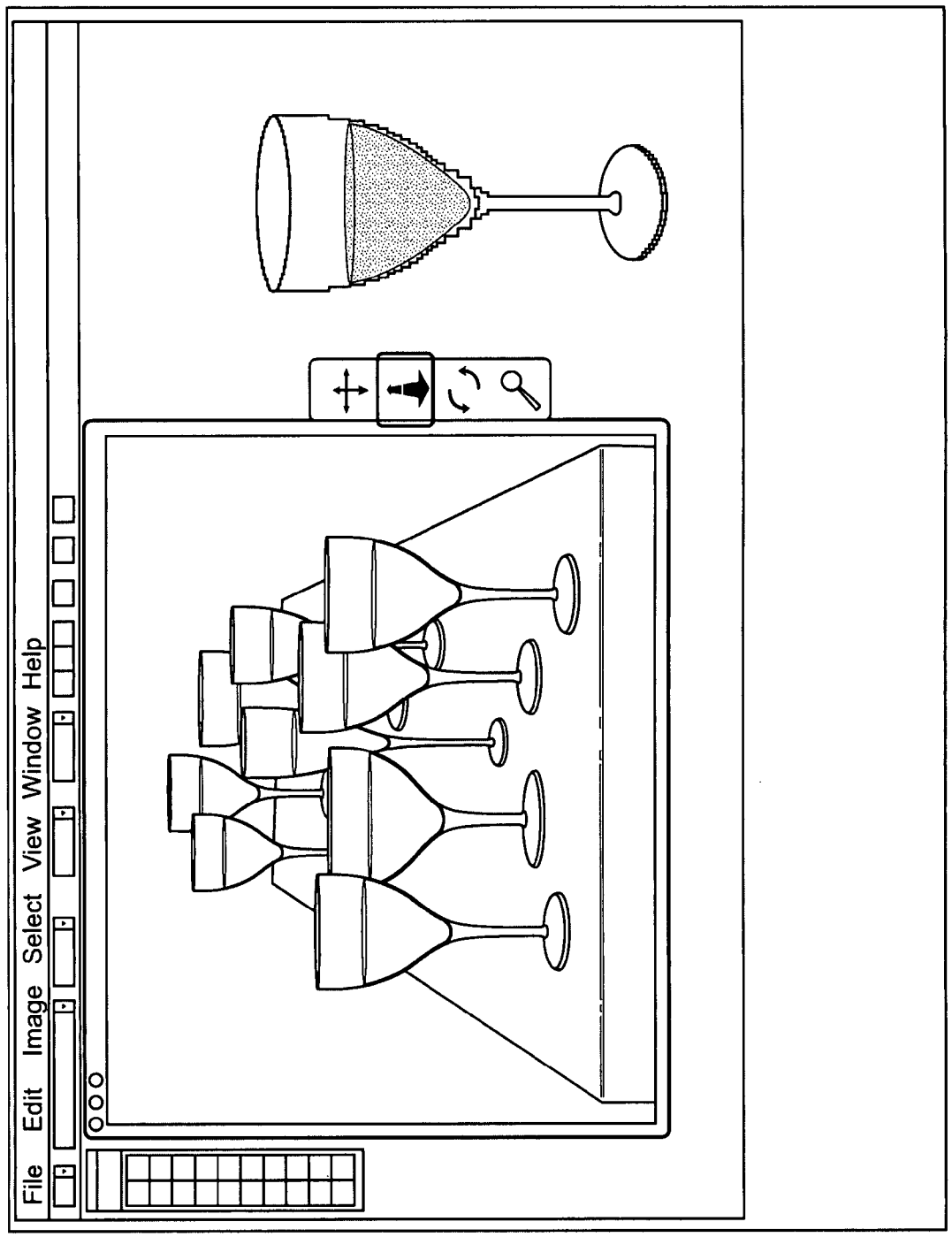

Turning next to FIGS. 11 to 19, a third example of a system of editing and rendering an on-screen image is provided, as follows. First, a 3D data set of a 2D object is stored. In this particular case, the 3D data set represents a single wine glass on the 2D document image. Next, as seen in FIGS. 12 and 13, the operator edits the image by changing the angle (and distance) from which the wine glass is viewed. As can be seen in FIGS. 12 and 13, the image of the wine glass being edited is slightly blurred. This is due to the fact that the rendering is being carried out in real time. An advantage of the present system is that the operator can continue to edit the image with both the editing and the rendering being carried out in real time.

Figure 14:
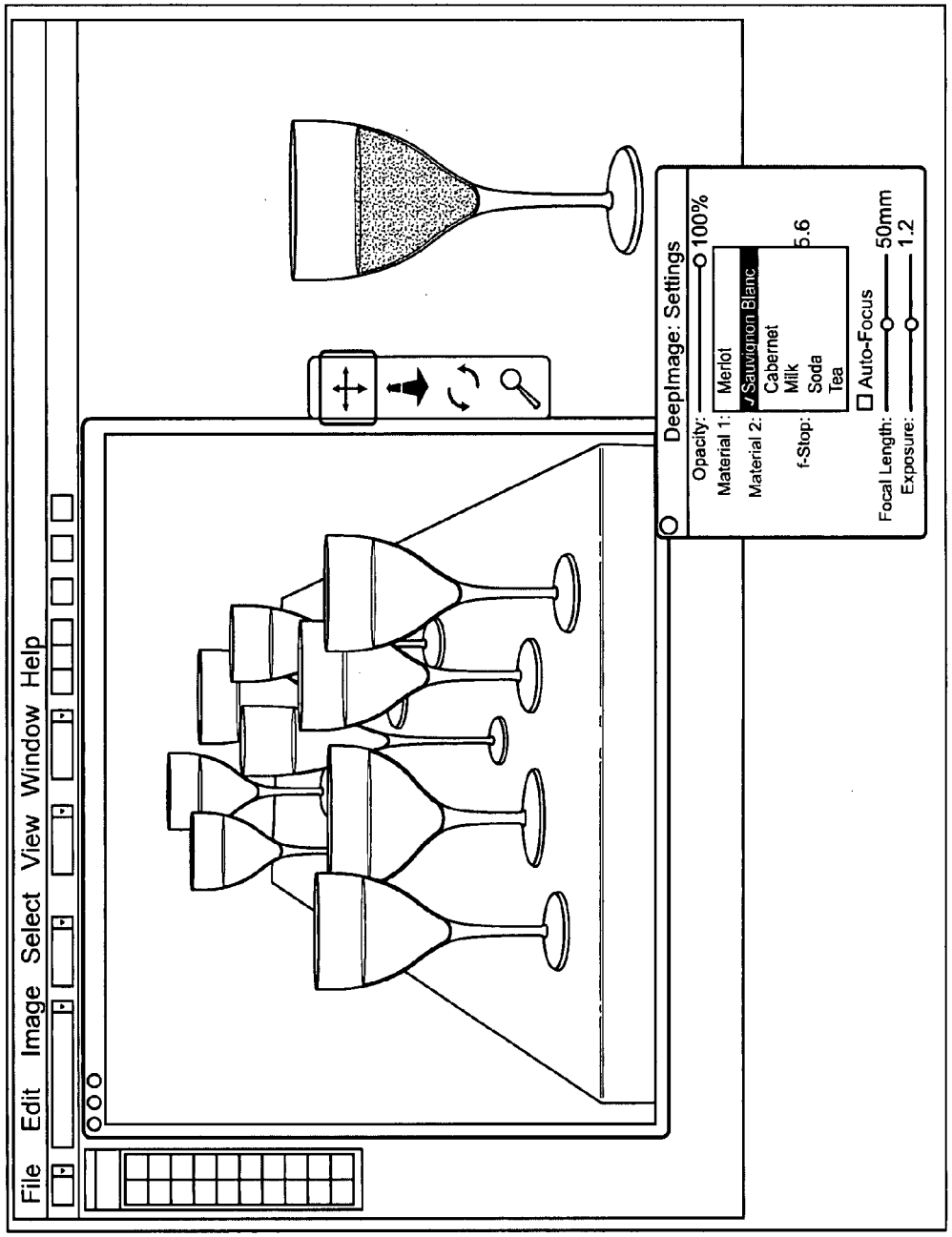
FIG. 14 is a screen shot of the image of FIG. 13, with the operator starting to edit tagged properties of the wine glass. In this example, the operator about to change the particular type of wine that is in the glass.
Figure 15:
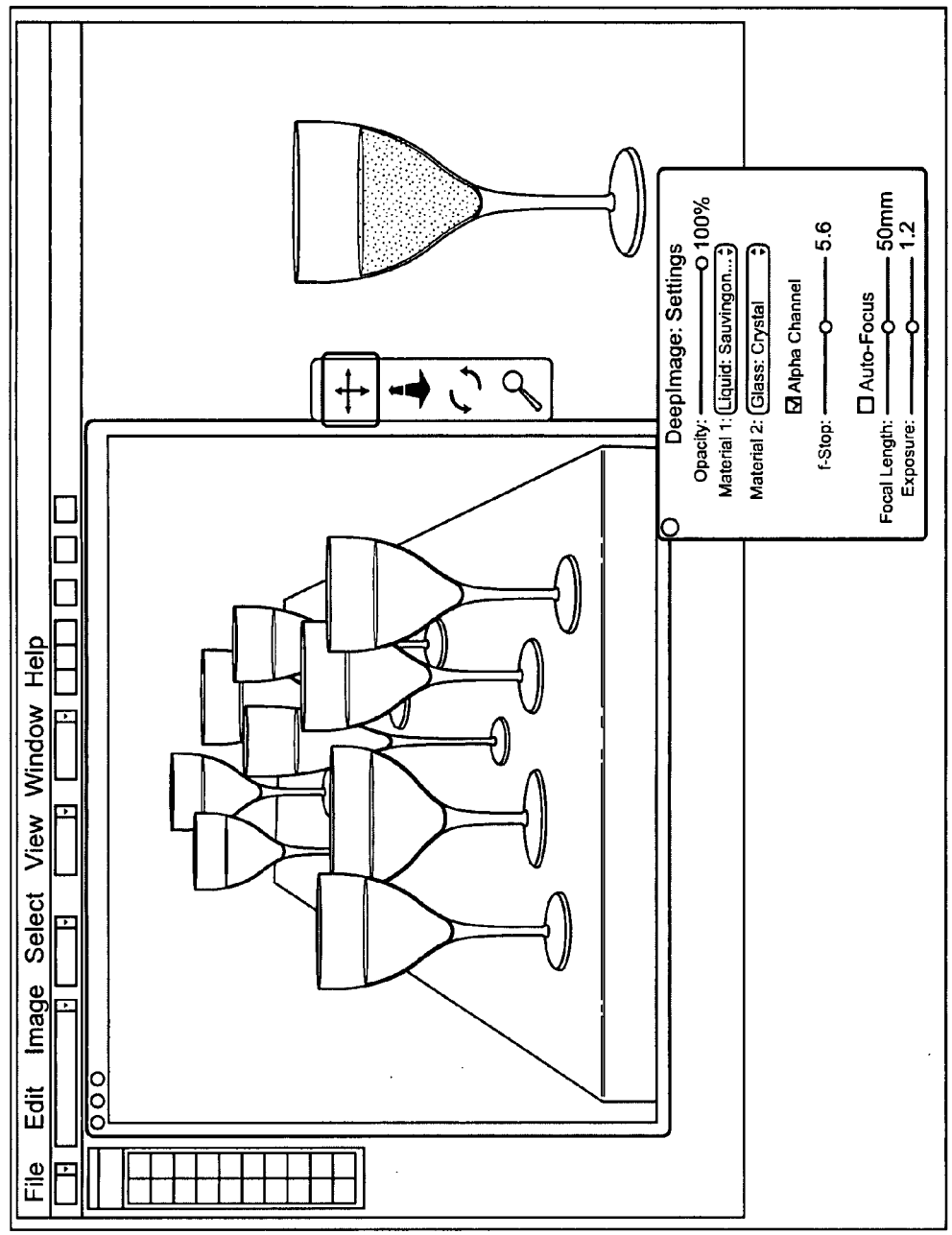
FIG. 15 is a screen shot following FIG. 14 in which the wine has been changed from Merlot (FIG. 14) to Sauvignon Blanc (FIG. 15).

Next, as seen in FIG. 14, the operator can also edit tagged properties of the wine glass. In the illustrated example, the operator calls up a menu to change the particular type of wine that is in the glass. This change is simply made by selecting and changing the pop-up Merlot (FIG. 14) to Sauvignon Blanc (FIG. 15). In this particular aspect of the invention, the "tagged" properties of the wine include, but are not limited to: focal distance, perspective distortion, focal length and F-stop. As can be seen in this example, the tagged material properties include both material 1 (i.e.: the wine) and material 2 (i.e.: the glass). Thus, an operator can quickly and easily change both wines and the glasses in which they are held when editing an image of a wine glass on a document.

Figure 16:
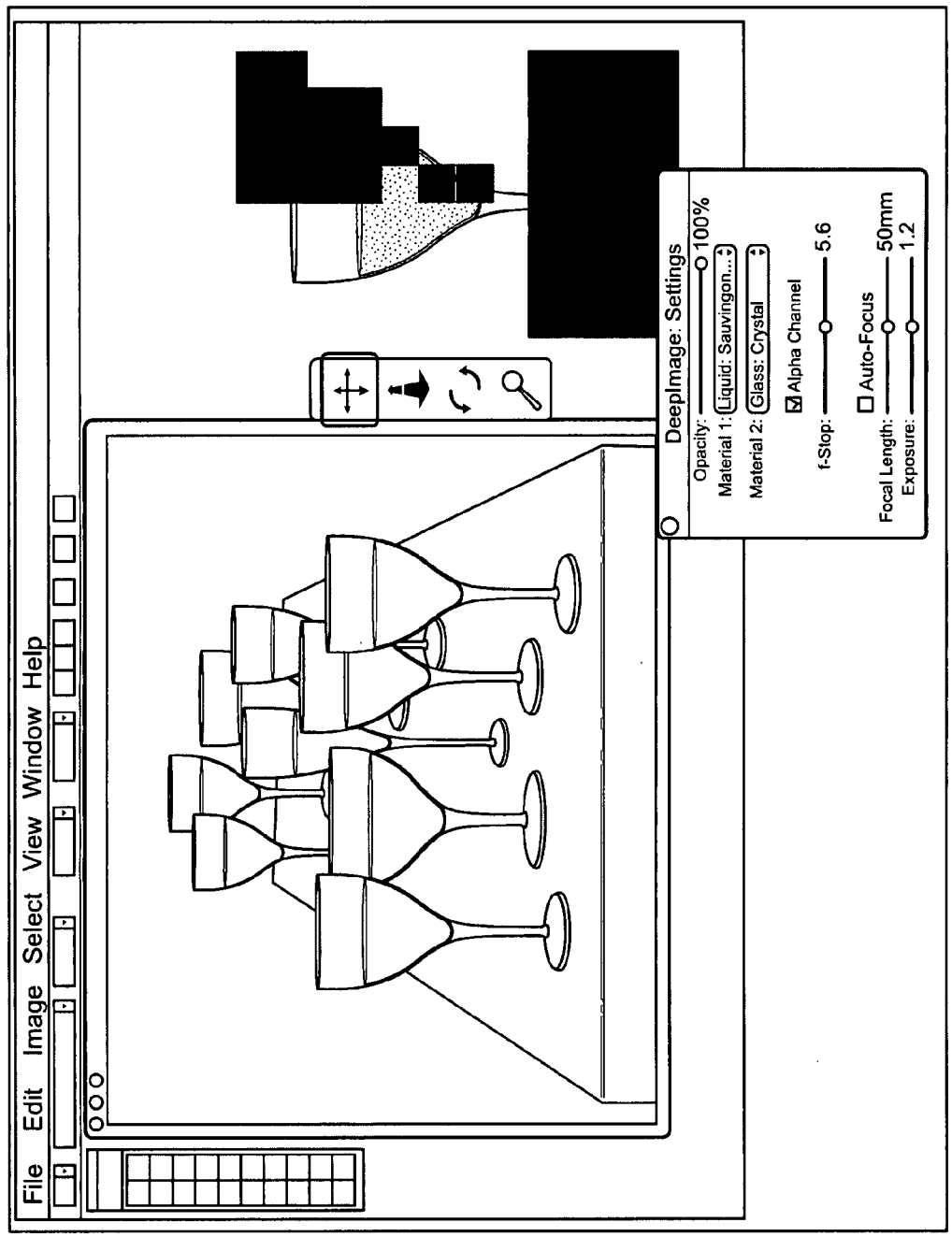
FIG. 16 is a screen shot of the rendering of the image of FIG. 15 using a progressive render path.
Figure 17:
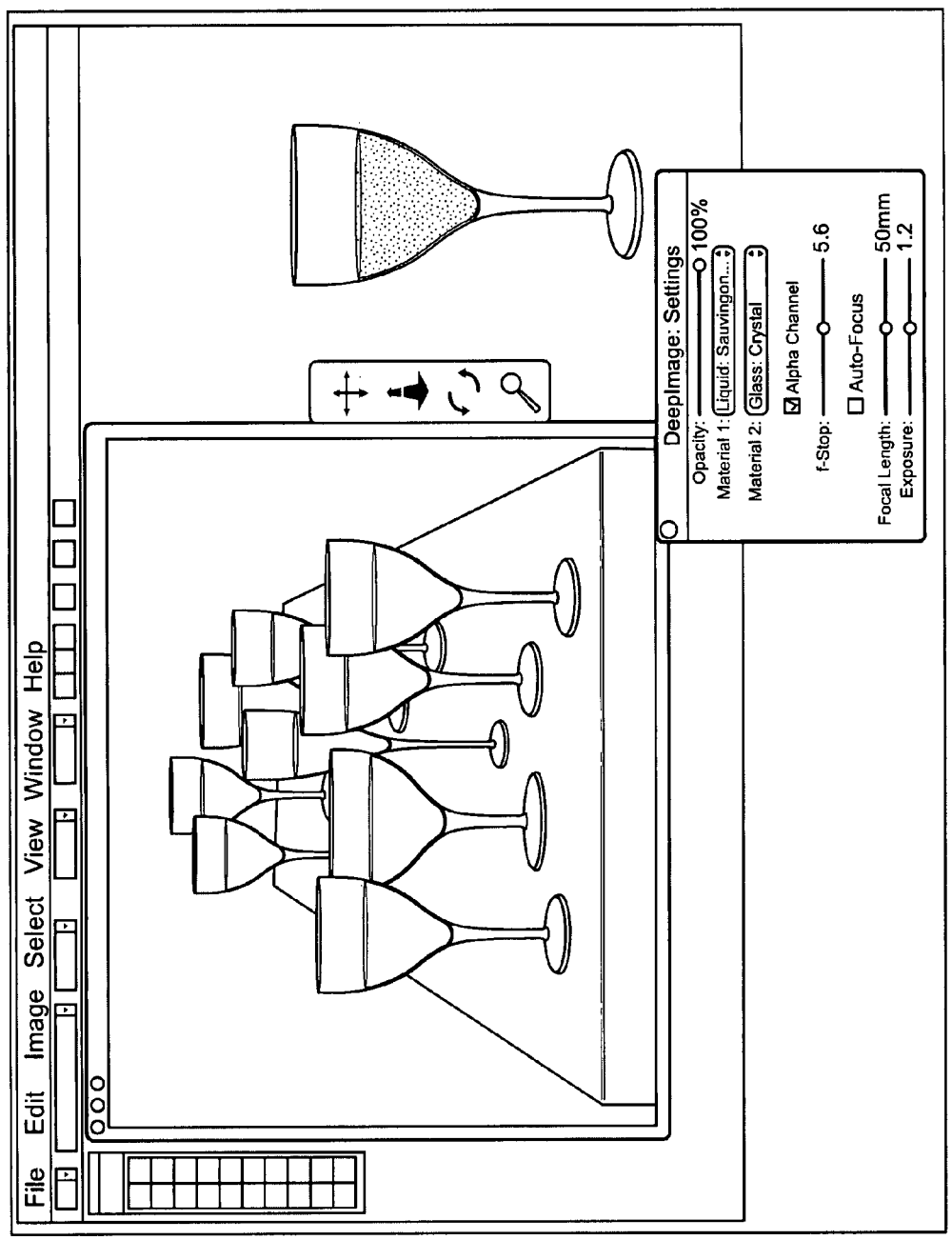
FIG. 17 is a screen shot of the final rendered image of FIG. 16.

Next, FIG. 16 shows a screen shot of the rendering of the image of FIG. 15 using a progressive render path. FIG. 17 shows the final rendered image of FIG. 16.

Preferably, the edited 3D image is rendered when the editing of the 3D data is completed. However, the 3D image can instead be simultaneously edited and rendered.

Figure 18:
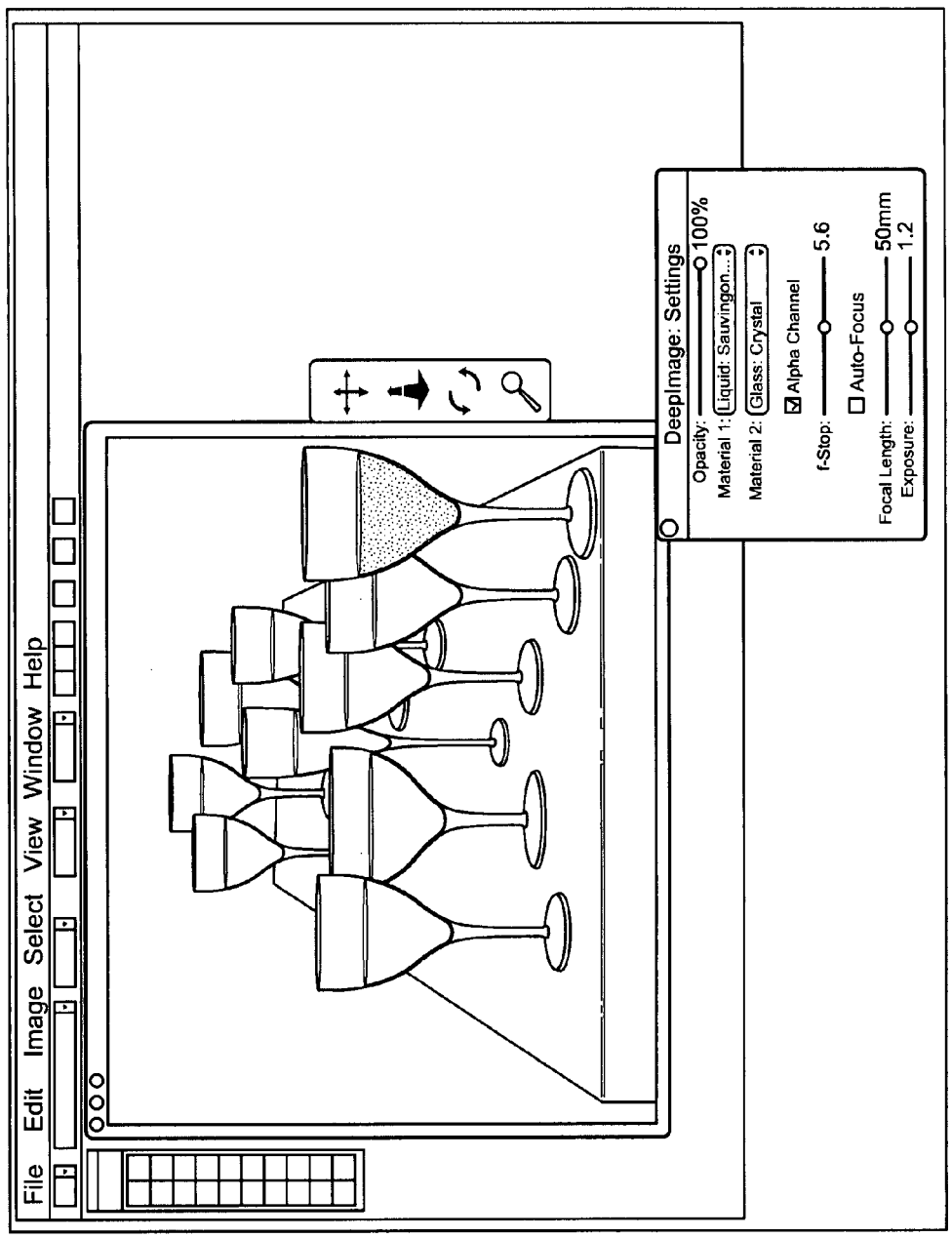
FIG. 18 is a screen shot of the final rendered image of FIG. 17 being re-positioned on the document.
Figure 19:
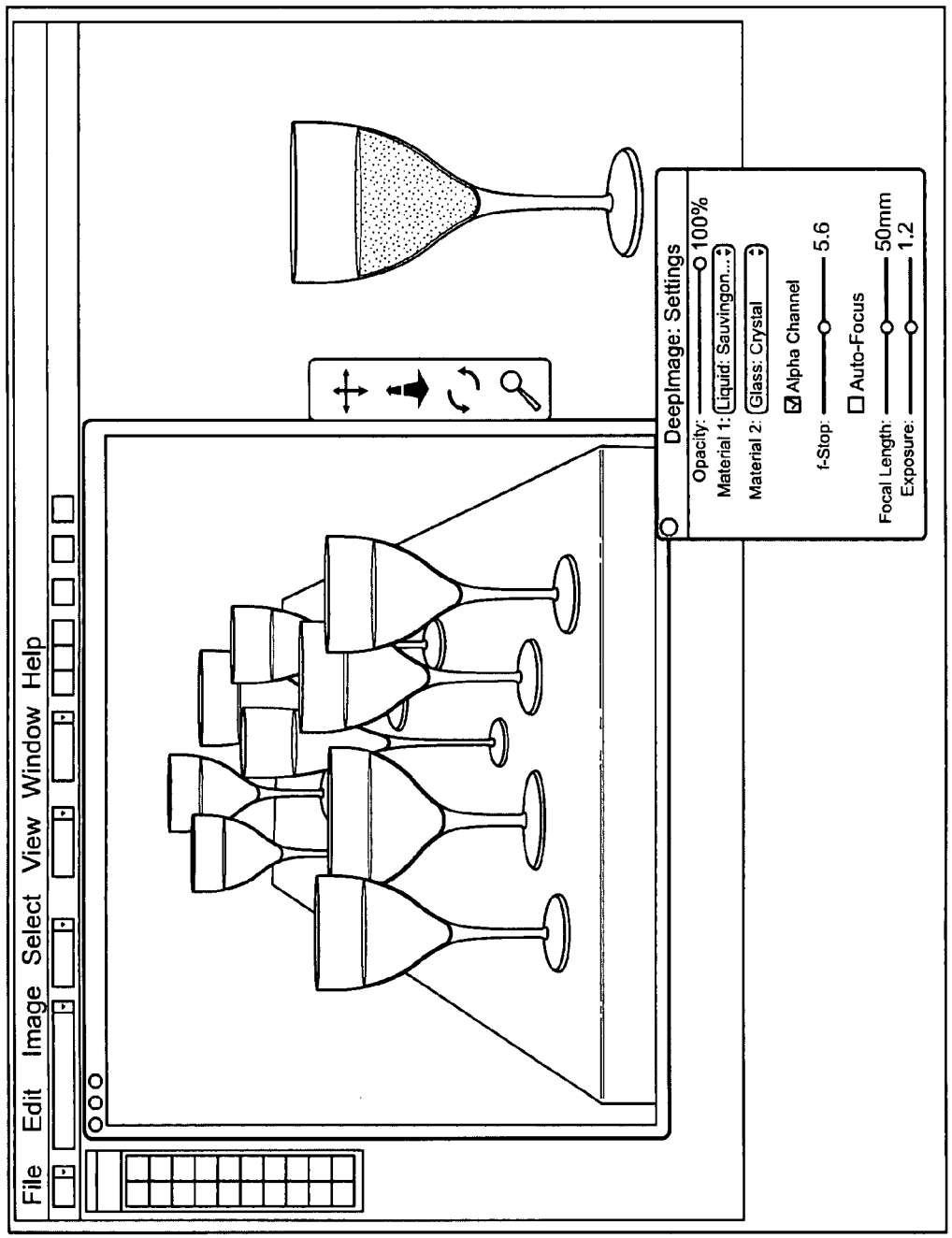
FIG. 19 is a screen shot of the final rendered image of FIG. 18 being re-positioned on the document (back to the position it was in FIG. 17).

In optional aspects of the invention, an operator is also able to move the object being edited on the document. For example, FIG. 18 shows the final rendered image of FIG. 17 being moved across the document. As can be seen, images below the wine glass can also be seen when the wine glass is moved there over. Lastly, as seen in FIG. 19, the wine glass can be moved back to its original position (i.e.: the same position as in FIG. 17).

What is claimed is:

1. A system of editing and rendering an on-screen image, comprising:
   storing 3D data of an object;
   storing a 2D image of surroundings of the object;
   displaying a first rendered 2D image of the object concurrently with the 2D image of the surroundings of the object;
   editing the 3D data of the object while simultaneously viewing the first rendered 2D image of the surroundings of the object, wherein editing the 3D data of the object comprises moving the object across the displayed 2D image of the surroundings of the object;
   rendering the edited 3D data of the object as a 2D image of the object to generate a second rendered image; and
   displaying the second rendered 2D image of the object concurrently with the 2D image of the surroundings of the object, wherein the 2D image of the object can be moved across the 2D image of the surroundings during the rendering step, such that the object is simultaneously rendered while being moved across the 2D image of the surroundings; wherein editing the 3D data of the object comprises an operator selecting both the degree to which rendering is carried out and the method of rendering used, and wherein the method of rendering selected by the operator comprises interactive ray tracing, a hardware accelerated render path, or an offline software rendering.

2. The system of claim 1, wherein editing the 3D data of the object comprises:
   editing the 3D data of the object in a 2D viewer;
   editing the 3D data of the object by interactive ray tracing when it is not possible to edit the 3D data of the object in the 2D viewer; and
   editing the 3D data of the object by a hardware accelerated offline render path when it is not desirable to edit the 3D data of the object by interactive ray tracing.

3. The system of claim 2, wherein it is not desirable to edit the 3D data of the object by interactive ray tracing when it is not possible to provide frames at a desired rate.

4. The system of claim 1, wherein the edited 3D data of the object is rendered when the editing of the 3D data is completed.

5. The system of claim 1, wherein rendering the edited 3D data of the object as a 2D image comprises:
   rendering the edited 3D data of the object as a 2D image by an interactive ray tracing;
   rendering the edited 3D data of the object as a 2D image by a hardware accelerated render path when it is not desirable to render the edited 3D data of the object as a 2D image by interactive ray tracing; and
   rendering the edited 3D data of the object as a 2D image by an offline software rendering when it is not desirable to render the edited 3D data of the object as a 2D image by a hardware accelerated render path.

6. The system of claim 1, wherein the 2D image of the object is simultaneously edited and rendered.

7. The system of claim 1, wherein the 2D image of the object is rendered when the operator finishes editing it.

8. The system of claim 1, further comprising:
   tagging the 3D data of the object with user-defined properties.

9. The system of claim 8, wherein the user-defined properties are edited in pop-up or drop-down menus.

10. The system of claim 1, wherein storing 3D data of an object comprises storing extra data to a standard 2D image of the object.

* * * * *